Aug. 7, 1956

A. Z. METZ 2,758,030

APPARATUS FOR AND METHOD OF DRAWING
OFF THE WORT IN MAKING BEER

Filed Jan. 21, 1952

INVENTOR.
AUGUSTO Z. METZ,
BY
Paul A. Weilein
ATTORNEY.

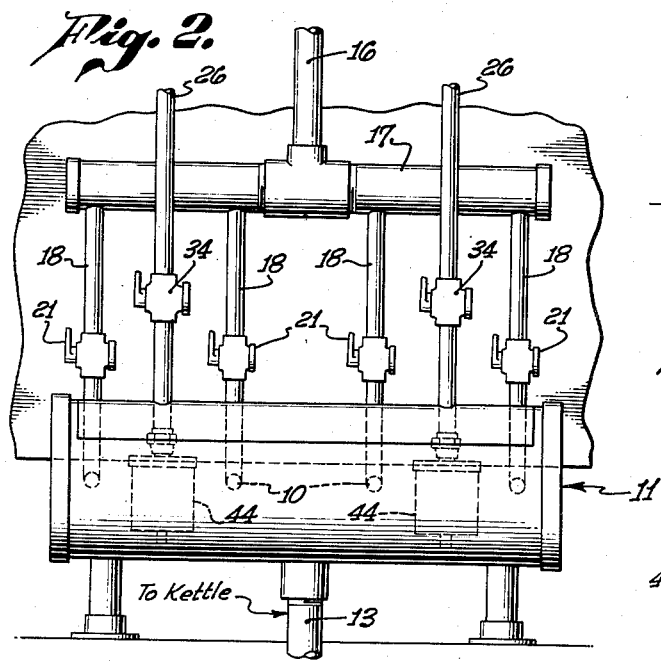
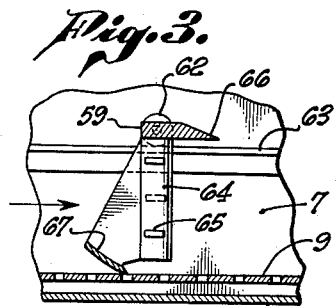
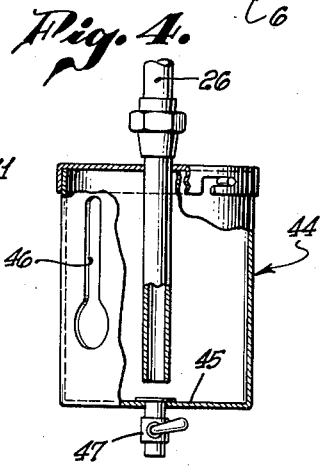
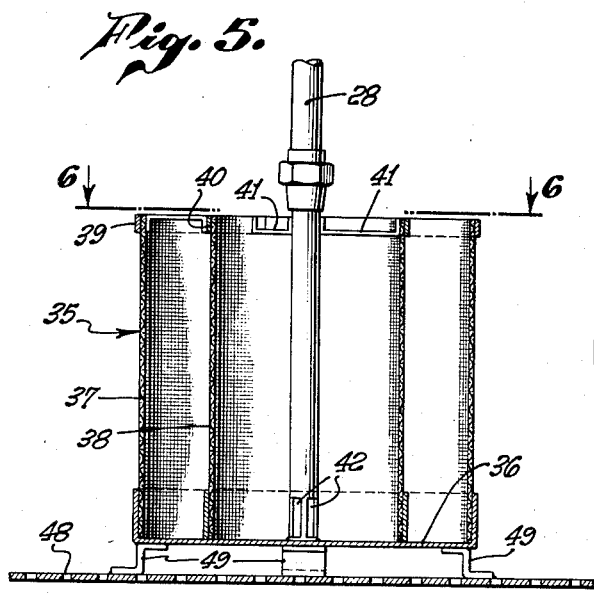
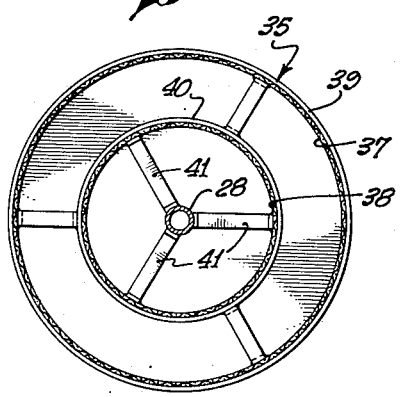

United States Patent Office 2,758,030
Patented Aug. 7, 1956

2,758,030

APPARATUS FOR AND METHOD OF DRAWING OFF THE WORT IN MAKING BEER

Augusto Z. Metz, Torreon, Coahuila, Mexico

Application January 21, 1952, Serial No. 267,427

29 Claims. (Cl. 99—52)

This invention relates to the production of beer, and more particularly to an apparatus and a method for drawing off from the tubs or other vessels in which the mashing operation is carried out, the extract or wort which is to be delivered to kettles in which the brewing operation is continued.

In brewing apparatus heretofore used, the wort is taken off by the gravitational filtering thereof through the mash. When the malt and malt adjuncts are ground too fine, or if for any other reason the mash becomes tightly packed, the rate of flow of the wort is reduced and causes undesirable amounts of proteins and unconverted starches to pass off with the wort, thereby impairing the brew. Moreover, this filtering of the wort through the mash interferes with the yield of the desired extract and in many instances the undesirable components withdrawn with the wort will give the brew an objectionable husk taste.

It is an object of this invention to provide an apparatus and a method by means of which the wort may be drawn off in a most efficient manner eliminating the aforementioned objections.

It is another object of this invention to provide an apparatus which will take off the total wort in approximately one-half the time heretofore required, thereby effecting an economy of time and increasing the capacity of the brewing apparatus.

It is another object of this invention to provide apparatus such as described by means of which a maximum malt extract free from undesirable components is obtained with a saving in the quantity of materials used per brew.

It is a further object of this invention to provide for the recovery of a wort which has a cleaner and more desirable taste and will produce a better coagulation in the kettle in which the brewing operation is continued.

It is another object of this invention to provide for the siphoning of wort from the top of the extract in a vessel containing the mash.

It is a further object to provide for the siphoning of the first wort or the total wort from the top of the extract while macerating the mash.

It is another object to provide for the aforesaid top-siphoning action through a vertically adjustable screen.

It is another object to provide for siphoning from the top of the mash extract while water is directed upwardly through the mash from the bottom of the mash tub.

It is a further object to provide for continuously siphoning off the wort while the mashing operations are being carried out, to obtain a thorough extraction of the desired components from a given amount of mash material.

It is another object of this invention to provide apparatus such as described wherein the clean wort obtained thereby will result in better preservation of the yeast in the fermenting cellar as well as a quicker clarification of the beer in the storage cellar and an improved taste of the finished product.

Another object of the invention is the provision of an apparatus and a method such as described by which the desired wort is obtained by being siphoned from the mash tubs in a manner which will keep the mash in a loose state whereby more thorough extraction of the malt extract and an increased yield are obtained from a given quantity of mash.

Still another object of this invention is the provision of wort draw-off apparatus of the character described which may be used for introducing water into the tub, or in other words, for sparging, without disturbing the mash.

It is another object of this invention to provide apparatus of the character described which is simple as to construction and capable of being easily installed in standard brewing apparatus.

It is another object of this invention to provide a combination mash and lauter tub having provision for increasing the yield of wort and siphoning off the total wort in an efficient manner.

It is another object of this invention to provide apparatus such as described having a plurality of siphoning devices which are mounted on a vertically adjustable screen plate in the tub to provide for a quicker and more effective drawing off of the wort than heretofore, without the objections which attend gravitational removal of the wort through the mash and underlet pipes.

This invention possesses many other advantages and has other objects which may be made more easily apparent from a consideration of one embodiment of the invention. For this purpose there is shown one form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

In the drawings:

Fig. 2 is an enlarged elevational view of the portion of the apparatus encompassed by the line 2—2 of Fig. 1;

Fig. 3 is a sectional view of the rotary macerating device, taken on the line 3—3 of Fig. 1;

Fig. 4 is a fragmentary sectional view of the liquid sealing device which is mounted in the grand to exclude the entrance of air into the siphon;

Fig. 5 is a vertical sectional view of one of the screened intake devices for the siphoning means; and Fig. 6 is a sectional view taken on the line 6—6 of Fig. 5.

Figure 1:
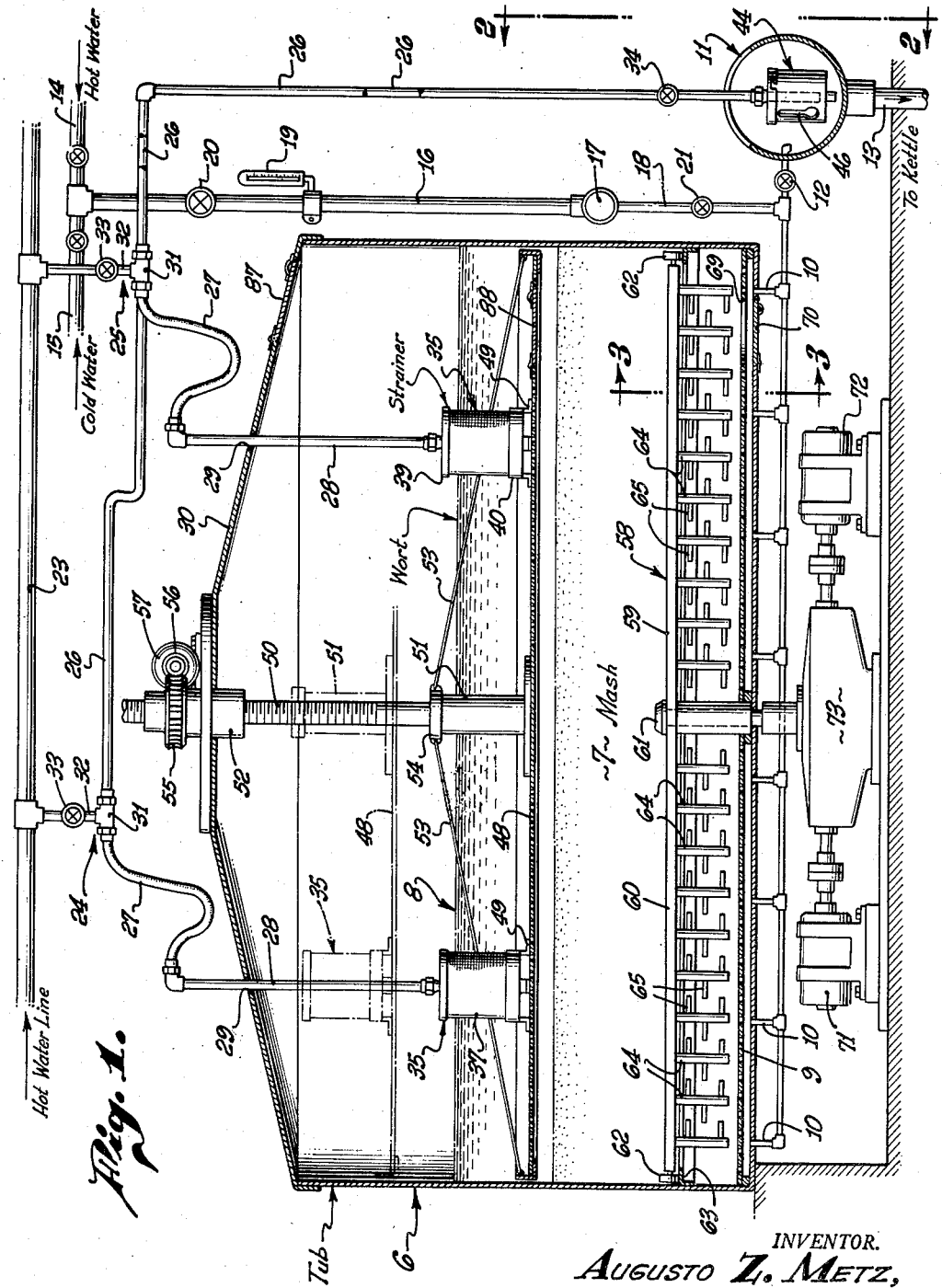
Fig. 1 is a partly diagrammatic view showing apparatus embodying the present invention.

Referring to Fig. 1, 6 represents a tub for producing from the mash 7, the malt extract or wort 8. This tub is equipped with a perforated and sectional false bottom 9 and underlet pipes 10, which latter lead to the grand 11. Valves 12 in the pipes 10 provide for control of the flow of wort to the grand 11. From the grand, the purpose of which is well known, the wort flows through other conduit means such as the pipe 13 to the usual kettle, not shown, in which the brewing operation is continued.

Water at the desired temperature and pressure may be supplied to the tube 6 from hot and cold water lines 14 and 15 respectively, by means of a pipe line 16 leading to a manifold 17 from which pipes 18 lead to the underlet pipes 10. A thermometer 19 is connected in the line 16 to determine the temperature of the water passing to the tub, the flow of the water being controlled by a valve 20 in the line 16 and valves 21 in the pipes 18. If desired the valves 12 in the underlet pipes 10 may be opened whereby the wort may be drawn off through the underlet pipes 10 and discharged into the grand at the same time the siphoning operation of this invention is being carried out. However, it is preferred to employ the siphon means exclusive of the underlet pipes for drawing off the wort.

Apparatus of the present invention may be installed in brewing apparatus of the character above described, for the purpose of siphoning the total wort from the mash tub or the like, into the grand, instead of depending upon the underlet pipes to convey the wort to the grand. Moreover, this apparatus is subject to use for sparging the mash in a manner which will not disturb the mash.

In accordance with this invention siphon means are connected with the hot water line 23 usually provided in connection with the brewing apparatus, and are operable for siphoning off the wort or for adding water to the mash. As here shown, the siphon means comprises a pair of like siphons 24 and 25 although one siphon or more than two may be employed.

Each of the siphons 24 and 25 includes as the longer leg thereof a pipe line 26 leading into the grand 11. The shorter leg includes a flexible hose 27 connected at one end with the upper end of the pipe line 26 and at its other end with a pipe 28 vertically adjustably mounted in the tub 6 through an opening 29 in the top or closure 30 on the upper end of the tub.

In each siphon, a T fitting 31 connects the two siphon legs with an extension 32 of the hot water line 23. Thus, each siphon may be charged with water to start the siphoning operation, there being a valve 33 in each extension 32 to control the flow therethrough. A similar valve 34 in the pipe line 26 of each siphon controls the flow into the grand 11. Each siphon may also be employed for adding water to the mash without agitating the mash.

A strainer 35 is mounted on the intake end of each siphon, that is, on the lower end of each vertically adjustable pipe 28. As shown in Figs. 5 and 6, each strainer 35 comprises an imperforate bottom wall 36 to which are secured concentric cylindrical walls 37 and 38 formed of wire screening of suitable mesh to exclude solids from entrance into the siphon. These screen walls are open at their upper ends where rings 39 and 40 are fixed thereto to provide the desired rigidity. The associated pipe 28 extends through the ring 40 to the bottom wall 36. Arms 41 fix the pipe 28 to this ring and if desired the lower end of the pipe may be secured, as by welding, to the bottom wall 36. Side openings 42 are provided in the sides of the lower end of the pipe 28 for ingress and egress of liquid.

For the purpose of excluding air from entering the discharge ends of the siphons 24 and 25, each siphon has a liquid seal around the discharge end of the pipe line 26. This seal is formed by means of a closed container 44 into which the pipe line 26 extends to a point adjacent the bottom wall 45 of the container. A discharge opening or slot 46 of keyhole shape is provided in one side of the container 44 with its lower enlarged end disposed above the discharge end of the pipe line 26, whereby the wort discharged into the container will maintain a liquid seal around the discharge end of the siphon. The slot 46 enables the operator to observe the volume of flow of the wort and the level of the wort maintained in the container. A valved outlet 47 is provided in the bottom wall 45 and may be opened for draining the receptacle 44 when the siphon is inoperative.

It is desired that the siphons 24 and 25 be simultaneously operated for a continuous siphoning of the top wort or extract from the tub. Thus, the strainers 35 are moved progressively as necessary to maintain the ends of the siphons below the level of the liquid in the tub. For this purpose the two strainers 35 are fixed to the upper side of a perforated screen or filter plate 48 which is vertically adjustably supported in the tub 6 and but slightly less in diameter than the inside diameter of the tub, having sufficient clearance therefrom to permit of free movement. Legs 49 on the lower ends of the strainers 35 are fixed to the plate 48 to space the strainers somewhat upwardly from the plate.

As here shown, means is provided for supporting and vertically adjusting the screen plate 48 and includes a vertically movable, screw threaded shaft 50 fixedly connected by suitable means 51 to the center of the screen plate 48. This shaft is axially slidably mounted in suitable bearing means 52 on top of the closure 30. Guy members 53 extend from a tubular portion 54 of the connecting means 51 to the outer edge of the screen plate 48 for steadying the latter.

A worm gear 55 having internal screw threads threadedly engaged on the shaft 50, is supported on the closure 30 in such manner that when driven by a worm 56, likewise mounted on the closure, it will cause the screw shaft 50 and screen plate 48 to be moved upwardly or downwardly depending upon the direction of rotation of the gear 55. Any suitable means, for example, an electric motor 57, may be employed for driving the worm 56, this means being controlled by the operator to maintain the intake ends of the siphons submerged as desired during the drawing off of the wort.

It is desired to macerate the mash during mashing operation as well as during the siphoning of the wort to augment the yield of wort. Accordingly, a rotary cutting or macerating means 58 is mounted in the tub 6 for operation adjacent the false bottom 9. This macerating means comprises arms 59 and 60 extending horizontally in opposite directions from a rotary shaft 61 projecting upwardly through the bottom of the tub 6. Rollers 62 on the outer ends of the arms 59 and 60 are disposed to ride upon a circular track 63 within the tub 6 for supporting the outer ends of these arms. A plurality of macerating blades or knives 64 depend from the arms 59 and 60, and each of these blades is provided with laterally directed blades or knives 65. The leading edges of the arms 59 and 60 also the blades, may be sharpened.

Each of the arms 59 and 60 supports an inclined blade 67 which is horizontally disposed close to the false bottom 9 to one side of the depending blades 64. These inclined blades will cause the mash to be macerated close to the surface of the false bottom and are operable for sweeping spent mash material through the opening 69 and trap door 70 in the false bottom 9 and the tub bottom respectively.

The shaft 61 may be selectively driven by motors 71 and 72 through suitable reduction gearing indicated at 73. The motor 71 is employed for rotating the macerating device at a greater speed than motor 72, for example, at the rate of 14 revolutions per minute, whereas motor 72 will drive the device at one revolution per minute. Any suitable means, not shown, may be provided for selectively operating these motors.

In commencing the mashing operation, the materials to be used in the mashing operation are introduced into the tub 6 through trap doors 87 and 88 in the closure 30 and screen plate 48, respectively, after water at the proper temperature and quantity has been let into the tub 6 through the underlet pipes 10 and the high speed motor 71 has been started for rotating the macerating device 58 at maximum speed. The usual mashing procedure is now carried out, and when the iodine tests show that the conversion period has been completed, hot water is let into the tub through the underlet pipes, while continuing with the operation of the macerating means. When the mash temperature reaches the appropriate point, additional water at the proper temperature and quantity is added to the mash to increase the quantity of the total mash, and the macerating device is then stopped to allow the mash to rest for the usual period, for example 30 minutes. The preceding operations are carried out while the screen plate is elevated above the mixture and when the proper rest period has been completed and the trap doors are tightly closed, the screen plate 48 is lowered to dispose the lower ends of the siphon 24 and 25 below the level of the extract in the tub, for example, as indicated in Fig. 1.

Following this lowering of the siphons 24 and 25, they are put into operation by opening the valves 33 and 34 and allowing water to run into and fill the legs of the siphons after which valves 33 are quickly closed while valves 34 remain open, whereupon the siphons will operate to draw off the top wort from the tub, the rate of flow being subject to regulation by manipulation of the valves 34.

As the level of the wort lowers, the screen plate 48 is lowered correspondingly so as to maintain the intake ends of the siphons below the level of the wort, thereby providing for a continuous siphoning of the wort into the grand. While the wort is being siphoned off in this manner the slow speed motor 72 may be started whereby the macerating device 58 will be turned slowly, gently to macerate or squeeze the mash materials to increase the extraction of the desired components of the mash.

As the level of the extract lowers, the screen plate 48 may be lowered until it touches and exerts a slight pressure on the solids of the mash. If a cloudy wort appears, a little more pressure of the screen plate on the mash should be applied by additionally lowering the screen plate. When the liquid level reaches a point below the intake ends of the siphons while the screen plate is in contact with the residual solids of the mash, the siphoning operation will stop. Thus, completing the first phase of operation of siphoning off the wort in accordance with this invention.

Next, water at the proper temperature is run into the tub 6 through the underlet pipes 10 and when the level of the water is at the proper height above the intake ends of the siphons 24 and 25, the siphons are again put into operation in the manner previously described. Upon starting this siphoning operation the slow speed motor 72 may be started to rotate the macerating device 58 slowly for the purpose hereinbefore stated. At this time the flow of water into the tub through the underlet pipes is regulated by setting the valves 20 and 21 to maintain the wort at a constant level which permits of continuous siphoning of the wort. When the kettle, not shown, into which the wort is conducted, is filled, the siphoning, macerating and water feed operations are stopped as the complete extraction of the given amount of mash material will have been accomplished. The amount of this material is gauged according to the capacity of tub 6 and the kettle. Thus, the two siphoning operations as hereinbefore carried out will have effected the desired extraction when the kettle is filled with wort.

The apparatus may be quickly prepared for another complete mashing and siphoning operation by raising the screen plate 48 to its uppermost position, then starting the high speed motor 71, whereby the horizontal blades 67 of the macerating device 58 will sweep the residue of the mash to cause discharge thereof through the opening 69 and trap door 70.

It should be noted that the greater portion of the wort will be siphoned from the tub very quickly in accordance with this invention, and that the mash will be maintained in a loose state allowing the water to flow readily into the mash and effect a thorough extraction and better yield of the desired components from a given amount of materials constituting the mash.

Further, it should be noted that the taking off of the first wort in a short time, removes the weight of the wort from the mash and prevents the mash from getting packed in a manner which would inhibit effective extraction of the desired components of the mash.

I claim:

1. The method of drawing off the total wort from a receptacle containing a brewing mash and the extract therefrom, which comprises siphoning the total wort from the top of the extract in the receptacle, and macerating the mash during the siphoning of the total wort.

2. In the method of preparing wort for fermentation with yeast and prior to the collecting of the separated wort for use in fermentation, the steps of drawing off the wort from a receptacle containing a brewing mash and the extract therefrom, which includes the steps of agitating the mash while maintaining the mash in a loose state to permit water to flow readily into said mash, drawing off the wort from the top of the extract during agitation of the mash, and adding water to the extract during said drawing off of the wort.

3. In the method of preparing wort for fermentation with yeast and prior to the collecting of the separated wort for use in fermentation, the steps of drawing off the wort from a receptacle containing a brewing mash and an extract therefrom, which comprises taking off the wort from the top of the extract in the receptacle, and introducing water under pressure upwardly into the mash while maintaining the mash in a loose state to permit water to flow readily into said mash during said taking off of the wort to displace the wort being removed.

4. In the method of preparing wort for fermentation with yeast and prior to the collecting of the separated wort for use in fermentation, the steps of drawing off the wort from a receptacle containing a brewing mash and an extract therefrom, which comprises drawing off the wort from the top of the extract in the receptacle, macerating the mash while maintaining the mash in a loose state to permit water to flow readily into said mash during said drawing off of the wort and introducing water under pressure upwardly into the mash during said drawing off of the wort.

5. The method of drawing off the wort from a receptacle containing a brewing mash and an extract therefrom, which comprises drawing off the wort from the top of the extract in the receptacle, and macerating the mash during said drawing off of the wort, and filtering the wort preliminarily to said drawing off thereof.

6. In the method of preparing wort for fermentation with yeast and prior to the collecting of the separated wort for use in fermentation, the steps of drawing off the total wort from a receptacle containing a brewing mash and an extract of the mash, which comprises drawing off the total wort of the brew from the top of the brew in the receptacle, and introducing water under pressure upwardly into the mash while maintaining the mash in a loose state to permit water to flow readily into said mash during said removal of the wort.

7. The method of drawing off the wort from a receptacle containing a brewing mash and an extract of the mash, which comprises removing the wort from the top of the extract in the receptacle, introducing water under pressure upwardly into the mash during said removal of the wort, maintaining a substantially constant level of the liquid in the mash while so removing the wort, and macerating the mash while siphoning the wort.

8. In the method of preparing wort for fermentation with yeast and prior to the collecting of the separated wort for use in fermentation, the steps of producing and withdrawing wort, which consists in macerating a brewing mash in a receptacle containing an extract of the mash, adding water to the mash while maintaining the mash in a loose state to permit water to flow readily into said mash and siphoning the wort from the extract while adding water beneath the mash.

9. The method of producing and withdrawing wort, which consists in macerating a brewing mash in a receptacle to increase the extract therefrom, adding water to the mash, siphoning the wort from the top of the wort while introducing water below the mash, and reducing the macerating action during the siphoning of the wort.

10. The method of producing and withdrawing wort, which consists in macerating a brewing mash in a receptacle and providing therein an extract of the mash, siphoning the wort from the receptacle, varying the macerating action while siphoning the wort and introducing water upwards into the mash below the level from which the wort is being siphoned, while maintaining the mash in a loose state to permit water to flow readily into said mash.

11. In apparatus for drawing off the wort developed from a mash within a receptacle, means forming a siphon adapted to have the shorter leg thereof disposed in the receptacle, means for adjustably supporting said shorter leg in said receptacle operable for maintaining the intake end thereof submerged in the liquid component of the mash, means for connecting said siphon forming means with a source of liquid under pressure, means for controlling the flow of liquid into said siphon forming means, means in said siphon forming means operable for regulating the flow of said liquid component therethrough and means for introducing water under pressure upwardly through said mash during operation of said siphon means while maintaining the mash in a loose state to permit water to flow readily into said mash.

12. In apparatus for drawing off the wort developed from a mash within a receptacle, means forming a siphon adapted to have the shorter leg thereof disposed in the receptacle, means for adjustably supporting said shorter leg in said receptacle operable for maintaining the intake end thereof submerged in the liquid component of the mash, said last named means including a screen through which the wort is strained before entering said intake end and means for introducing water under pressure upwardly through said mash during operation of said siphon means while maintaining the mash in a loose state to permit water to flow readily into said mash.

13. In apparatus for drawing off the wort developed from a mash within a receptacle, means forming a siphon adapted to have the shorter leg thereof disposed in the receptacle, means for adjustably supporting said shorter leg in said receptacle operable for maintaining the intake end thereof submerged in the liquid component of the mash, said last named means including a screen through which the wort is strained before entering said intake end, means for suspending said screen in said receptacle operable to raise and lower the screen and means for introducing water under pressure upwardly throug said mash during operation of said siphon means while maintaining the mash in a loose state to permit water to flow readily into said mash.

14. In apparatus for drawing off the wort developed from a mash within a receptacle, means forming a siphon adapted to have the shorter leg thereof disposed in the receptacle, means for adjustably supporting said shorter leg in said receptacle operable for maintaining the intake end thereof submerged in the liquid component of the mash, said last named means including a screen on the upper side of which said intake end is mounted and means for introducing water under pressure upwardly through said mash during operation of said siphon means while maintaining the mash in a loose state to permit water to flow readily into said mash.

15. In apparatus for drawing off the wort developed from a mash within a receptacle, means forming a siphon adapted to have the shorter leg thereof disposed in the receptacle, means for adjustably supporting said shorter leg in said receptacle operable for maintaining the intake end thereof submerged in the liquid component of the mash, said last named means including a screen on which said intake end is mounted, a member mounting said screen in said receptacle operable for raising and lowering said screen and said intake end and means for introducing water under pressure upwardly through said mash during operation of said siphon means while maintaining the mash in a loose state to permit water to flow readily into said mash.

16. In apparatus for drawing off the wort developed from a mash within a receptacle, means forming a plurality of siphons adapted to have the shorter legs mounted in said receptacle, means for adjustably supporting said shorter legs in said receptacle optionally operable for maintaining the intake ends thereof above or below the level of the liquid component of the mash and means for introducing water under pressure upwardly through said mash during operation of said siphon means while maintaining the mash in a loose state to permit water to flow readily into said mash.

17. In apparatus for drawing off the wort developed from a mash within a receptacle, means forming a siphon adapted to have the shorter leg thereof disposed in the receptacle below the level of the wort, means for vertically adjusting the shorter leg relative to the other leg of the siphon, means forming a liquid seal around the discharge end of the other leg of said siphon forming means, means embodied in said siphon forming means for connecting both legs thereof with a source of supply of liquid under pressure and means for introducing water under pressure upwardly through said mash during operation of said siphon means while maintaining the mash in a loose state to permit water to flow readily into said mash.

18. In apparatus for drawing off the wort developed from a mash within a receptacle, means forming a siphon adapted to have the shorter leg thereof disposed in the receptacle, a screen fixed upon the intake end of said shorter leg adapted to be submerged in the wort, means for vertically adjusting said screen and the intake end relative to the level of the wort and means for introducing water under pressure upwardly through said mash during operation of said siphon means while maintaining the mash in a loose state to permit water to flow readily into said mash.

19. In apparatus for drawing off the wort developed from a mash within a receptacle, means forming a siphon adapted to have the shorter leg thereof disposed in the receptacle, a screening means on the intake end of said shorter leg through which the wort passes into the siphon, means for vertically adjustably supporting said shorter leg within said receptacle and means for introducing water under pressure upwardly through said mash during operation of said siphon means while maintaining the mash in a loose state to permit water to flow readily into said mash.

20. In apparatus for drawing off the wort developed from a mash within a receptacle, means forming a siphon adapted to have the shorter leg thereof disposed in the receptacle, a screening means at the intake end of said shorter leg for excluding solids from entering the siphon, a perforate plate on which said screening means is mounted, means for vertically adjustably supporting said plate within said receptacle and means for introducing water under pressure upwardly through said mash during operation of said siphon means while maintaining the mash in a loose state to permit water to flow readily into said mash.

21. In apparatus for producing wort, a receptacle for the mash, means for introducing water upwardly into the mash, means forming a siphon having the shorter leg disposed in the receptacle, means operable for adjusting the shorter leg relative to the level of the wort in the receptacle during said introduction of water, said last named means including a screen plate on which said shorter leg is mounted, and a member supporting said plate operable exteriorly of said receptacle for raising and lowering the plate.

22. In combination, a receptacle in which a malt extract is developed from a body of mash for the production of beer; a water supply line; conduit means for drawing the malt extract from the receptacle after it has filtered through the body of the mash; other conduit means for carrying the extract from the first conduit means to a second receptacle for further treatment; means connected with the first mentioned receptacle, said water supply line and said conduit means for forming a siphon for drawing off the malt extract into the second named conduit means independent of flow through said first mentioned conduit means; and means for rendering said siphon forming means operative and inoperative.

23. In combination, a receptacle in which a malt extract is developed from a body of mash for the production of beer; a water supply line; valved conduit means for drawing the malt extract from the receptacle after it has filtered through the body of the mash; other conduit means for carrying the extract from the first conduit means to a second receptacle for further treatment; means connected with the first mentioned receptacle, said water supply line and said conduit means for forming a siphon for drawing off the malt extract into the second named conduit means independent of flow through said first mentioned conduit means; means for rendering said siphon forming means operative and inoperative; and means for adjusting the intake of the siphon forming means with respect to the level of the malt in the first mentioned receptacle.

24. In brewing apparatus for producing and drawing off the wort from a mash, a receptacle for the mash, underlet pipes connected with the bottom of the receptacle, means for connecting said pipes with a source of water, means for controlling the flow of water from said pipes into said receptacle, a screen plate, means vertically adjustably suspending said plate in said receptacle, means forming a siphon having its longer leg fixed outside the receptacle and its shorter leg vertically adjustable in the receptacle and connected with said plate for movement therewith, means forming a valved connection of said siphon forming means with a source of water, and means for controlling the flow of wort through said siphon forming means.

25. In brewing apparatus for producing and drawing off the wort from a mash, a receptacle for the mash having a perforated false bottom, underlet pipes connected with the bottom of the receptacle, means for connecting said pipes with a source of water, means for controlling the flow of water through said pipes into the receptacle, a macerating device operable in said receptacle above said false bottom, a perforated screen plate, means vertically adjustably supporting said plate in said receptacle, and means forming a siphon having the shorter leg disposed within the receptacle and connected with said screen plate for movement therewith.

26. In brewing apparatus for producing and drawing off the wort from a mash, a receptacle for the mash, having a perforate false bottom, underlet pipes connected with the bottom of the receptacle, means for connecting said pipes with a source of water, means for controlling the flow of water through said pipes into the receptacle, a macerating device operable in said receptacle above said false bottom, a perforated screen plate, means vertically adjustably supporting said plate in said receptacle, means forming a siphon having the shorter leg disposed within the receptacle and connected with said screen plate for movement therewith, and means for connecting said siphon forming means with a source of water under pressure including a valve for controlling the flow of water into the siphon forming means.

27. In the method of preparing wort for fermentation with yeast and prior to the collecting of the separated wort for use in fermentation, the steps of removing the total wort from a mash which comprises: introducing water upwardly into the mash; and continuously drawing off the wort of the mash from the top of the mash during such introduction of the water while maintaining the mash in a loose state to allow water to flow readily into the mash.

28. In the method of preparing wort for fermentation with yeast and prior to the collecting of the separated wort for use in fermentation, the steps of removing the total wort from a mash which comprises: introducing water upwardly into the mash; continuously drawing off the wort of the mash from the top of the mash during such introduction of the water; and agitating the mash during said continuous draw off of the wort while maintaining the mash in a loose state to allow water to flow readily into the mash.

29. In brewing apparatus for producing and drawing off the wort from a mash; a receptacle for the mash having a perforated false bottom; underlet pipes connected with the bottom of the receptacle; means for connecting said pipes with a source of water; means for controlling the flow of water through said pipes into said receptacle; a macerating device operating in said receptacle above said false bottom; a screen plate; means vertically adjustably supporting said plate in said receptacle; and means for drawing off wort from the top of the brew in the receptacle; said last named means including a conduit having an intake end disposed within the receptacle and connected with said screen plate for movement therewith to draw off the wort from the top of the brew.

References Cited in the file of this patent
UNITED STATES PATENTS

| | | |
|---|---|---|
| 553,269 | Sobotka et al. | Jan. 21, 1896 |
| 655,398 | Funk | Aug. 7, 1900 |
| 1,328,079 | Davis | Jan. 13, 1920 |
| 2,229,875 | Schwarz et al. | Jan. 28, 1941 |